(12) United States Patent
Chappell et al.

(10) Patent No.: US 6,279,024 B1
(45) Date of Patent: Aug. 21, 2001

(54) HIGH PERFORMANCE, LOW POWER INCREMENTER FOR DYNAMIC CIRCUITS

(75) Inventors: Barbara Alane Chappell; Terry Ivan Chappell, both of Portland, OR (US); Sang Hoo Dhong, Austin, TX (US); Mark Samson Milshtein, Hillsboro, OR (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 08/582,716

(22) Filed: Jan. 4, 1996

(51) Int. Cl.[7] ........................................ G06F 7/50
(52) U.S. Cl. ......................................... 708/672
(58) Field of Search .................... 364/770, 787; 327/202, 203, 199, 407, 409, 410; 365/194, 230.08, 189.05; 708/672

(56) References Cited

U.S. PATENT DOCUMENTS 3,989,940 * 11/1976 Kihara ................................ 364/770
4,417,315 * 11/1983 Russell ............................... 364/770
5,345,110 * 9/1994 Renfro et al. ...................... 327/199
5,384,724 * 1/1995 Jagini ................................. 364/770

OTHER PUBLICATIONS

"FET DRAM Look–Ahead Address Incrementer" IBM, Tech. Discl. Bul., vol. 28 No. 1 Jun. 1985, pp. 71–73.*

* cited by examiner

Primary Examiner—Tan V. Mai
(74) Attorney, Agent, or Firm—McGuireWoods, LLP; Paul J. Otterstedt

(57) ABSTRACT

A dynamic incrementer, implemented in the Self Resetting Complementary Metal Oxide Semiconductor (SRCMOS) circuit family, which internally performs single rail calculations and which generates the dual rail result using a strobing technique. The carry-lookahead function is implemented with an OR tree using the complement input signals, resulting in a very fast and economical incrementer.

9 Claims, 6 Drawing Sheets

4 WAY SRCMOS OR GATE

HIGH PERFORMANCE, LOW POWER INCREMENTER FOR DYNAMIC CIRCUITS

FIELD OF THE INVENTION

The invention is a dynamic incrementer, implemented in the Self Resetting Complementary Metal Oxide Semiconductor (SRCMOS) circuit family, which internally performs single rail calculations and which generates the dual rail result using a strobing technique. The carry-lookahead function is implemented with an OR tree using the complement input signals, resulting in a very fast and economical incrementer.

BACKGROUND OF THE INVENTION

Circuits which perform addition by 1, known as incrementers, are widely used in microprocessors due to the sequential nature of instruction generation and execution. Implementation in dynamic logic offers considerable speed advantages. However, adders and incrementers use both true and complement signals. In dynamic logic schemes, if both true and complement ("dual rail") signals are required, they usually have to be generated in parallel from the preceding latch, thereby consuming twice the area of and dissipating more power than single-rail logic. Therefore an optimized incrementer can provide a reduction in area and in power dissipated across an entire microprocessor chip.

In an incrementer, as in an adder, the critical path consists of the calculation of the carry signals. These are usually calculated by the use of an AND tree, which can be 64 high in state of the art 64-bit microprocessors. This limits the achievable speed.

SUMMARY OF THE INVENTION

The invention is comprised of an incrementer architecture based on a single rail, negative logic OR tree for the carry look-ahead function. Such an OR function is faster, dissipates less power, and occupies considerably less area than a corresponding AND function.

The dual rail sum is calculated using a strobed XOR function. This strobing technique eliminates the duplication associated with calculating both true and complement signals from the start.

This incrementer can be constructed using all types of dynamic logic whether the reset signal is generated locally, as in Self Resetting CMOS (SRCMOS) logic, or clock distributed as e.g., in Domino logic (see Weste and Eshragian, "Principles of CMOS VLSI Design: A systems perspective", Addison Wesley, Reading Mass., 1988).

The above architecture allows this incrementer to be used in high speed circuits with low latency and fast cycle time.

DETAILED DESCRIPTION OF THE PREFERRED EMBODIMENTS

Figure 1:
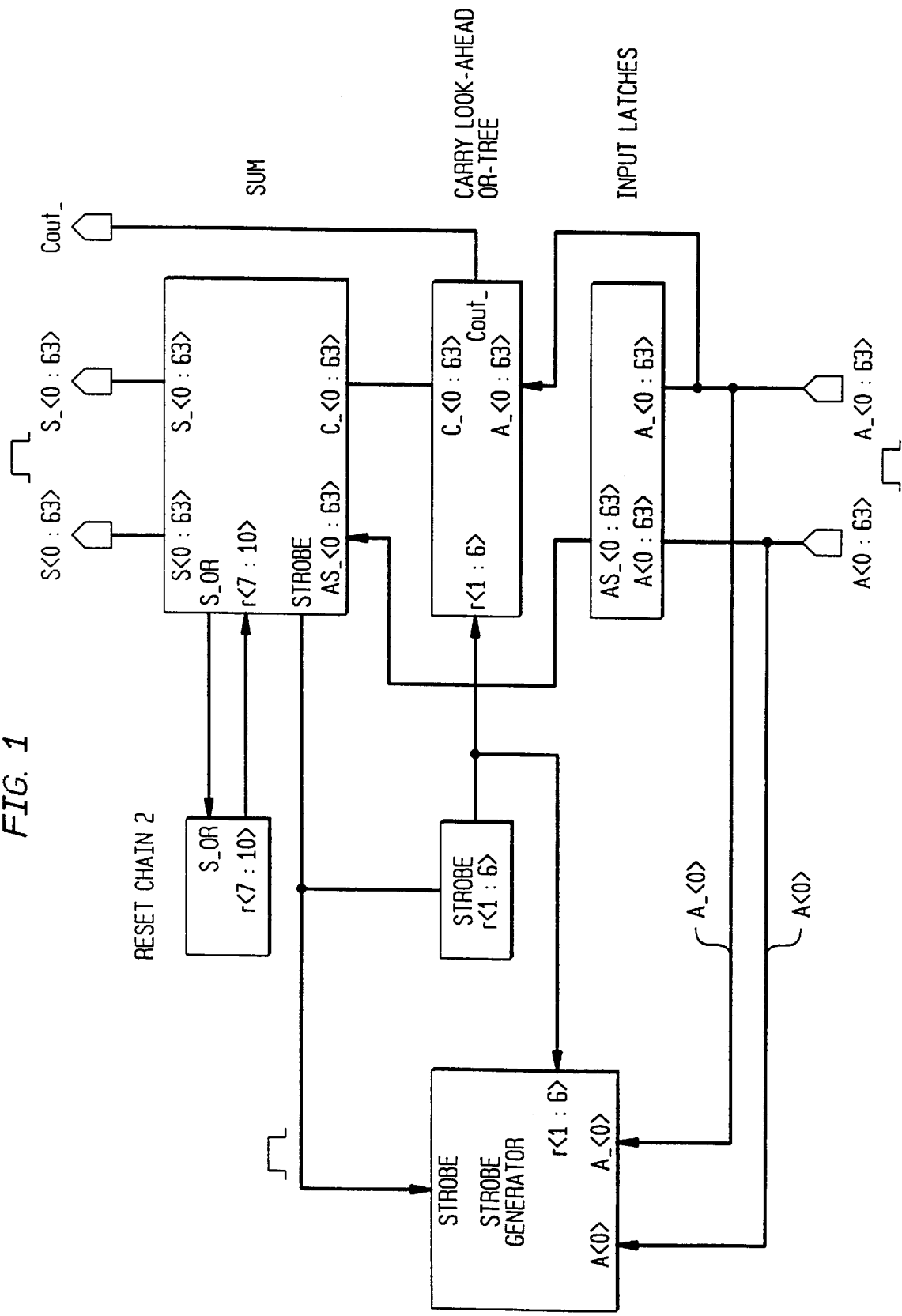
FIG. 1 is a schematic diagram of the major components of the incrementer.

FIG. 1 shows an overview of the major building blocks comprising the preferred implementation of the present invention. Each block will be described in detail below.

A preferred embodiment is a 64-bit incrementer. However, reduction of the present scheme to less bits or extension to more bits is straight forward.

The present invention can be implemented in any dynamic logic family. The embodiment shown here is in SRCMOS logic, as described in commonly assigned and copending U.S. application Ser. No. 08/463,146, filed Jun. 5, 1995, now U.S. Pat. No. 5,633,820, by Chappell et al., and complies with the SRCMOS test modes described in commonly assigned and copending U.S. patent application Ser. No. to 08/583,300, filed Dec. 6, 1995, now U.S. Pat. No. 5,748,012, by Chappell et al. ("Chappell").

The core of the present invention is the carry look-ahead circuit. First, the familiar logic functions for the sum signals $S_i$ and carry signals $C_i$ are given for an n-bit adder (see Weste and Eshragian, "Principles of CMOS VLSI Design: A systems perspective", Addison Wesley, Reading Mass., 1988):

$$S_i = A_i \oplus B_i \oplus C_i$$

$$C_{i+1} = A_i B_i + (A_i + B_i) C_i \quad i=0 \ldots n-1 \quad (1)$$

For an incrementer, since $B_i = 0 (i=0 \ldots n-1)$, this simplifies to:

$$S_i = A_i \oplus C_i$$

$$C_0 = 1$$

$$C_{i+1} = A_i C_i \quad i=0 \ldots n-1 \quad (2)$$

The last equation implies an n-high AND tree for the most significant carry bit $C_{n-1}$. In dynamic logic, however, an OR function can be implemented faster and using less area than an equivalently wide AND function, and thus it is advantageous to calculate the complemented carry signals:

$$S_i = A_i \oplus C_i = A_i \overline{C_i} + \overline{A_i} C_i$$

$$\overline{S_i} = \overline{A_i \oplus C_i} = A_i C_i + \overline{A_i}\,\overline{C_i} \quad (3)$$

$$\overline{C_0} = 0$$

$$\overline{C_{i+1}} = \overline{A_i} + \overline{C_i} \quad i=0 \ldots n-1$$

Figure 2:
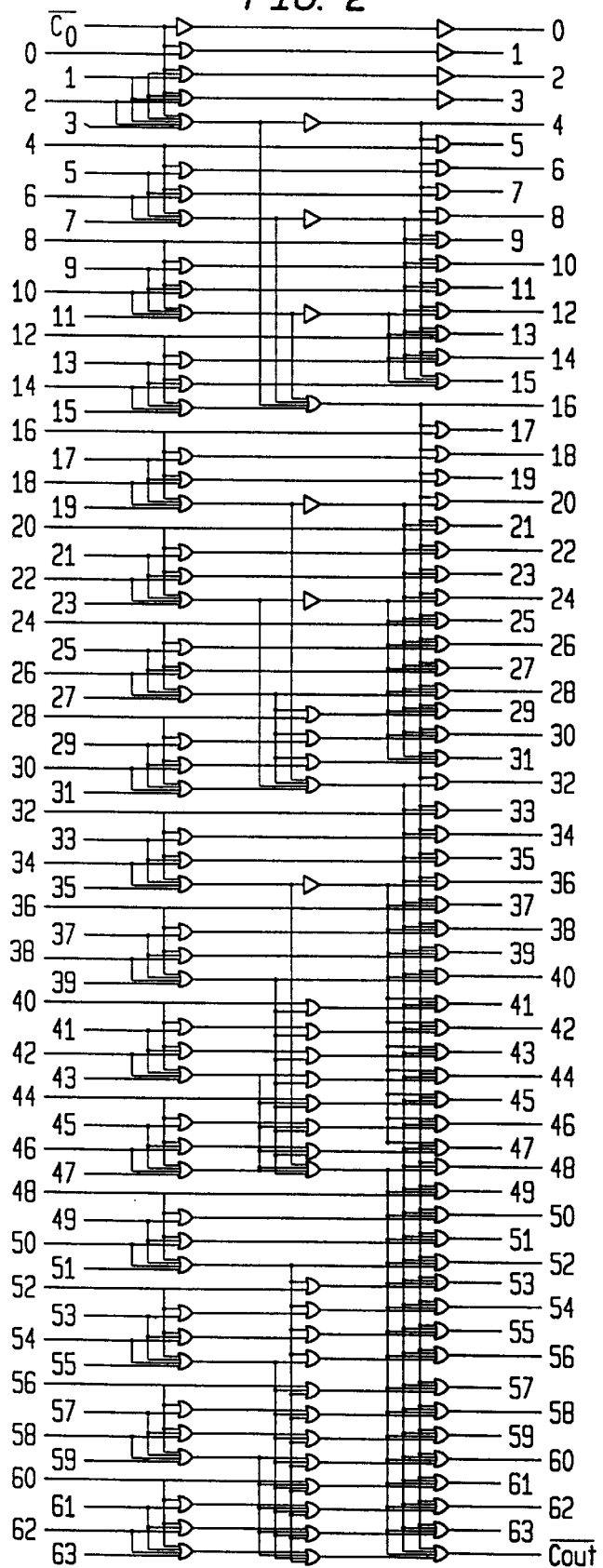
FIG. 2 is a schematic diagram of the carry look-ahead OR tree of FIG. 1.

In FIG. 2, the OR tree circuit that implements the last equations for $\overline{C_i}$ (i=0 . . . n) is schematically shown for a 64-bit incrementer. At the bottom, the input signals $\overline{A_i}$ (i=0 . . . 63) are indicated by their index i. The $\overline{C_0}$ input is shown tied to ground. At the top of the figure, the output signals $\overline{C_i}$ (i=0 . . . 63) and $\overline{C_{out}} = \overline{C_{64}}$ are indicated by their index i.

The circuit of FIG. 2 implements a 4-bit merge carry look-ahead scheme. Except for a single 5-wide OR gate, the OR gates are maximally 4 wide, and they are arranged in a balanced tree. Buffers have been inserted into the tree to balance delay and to provide for the necessary drive of the signals with larger fan-out. Using the configuration of FIG. 2, no Carry signal takes more than 3 gate delays to be calculated.

Figure 3:
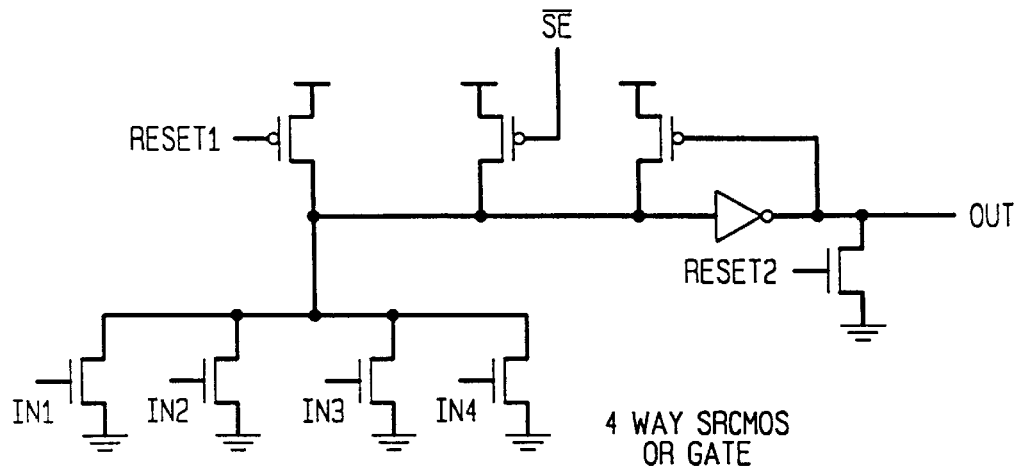
FIG. 3 shows a self-resetting 4-wide OR gate as used in FIG. 2.

A 4-wide OR element is shown in FIG. 3, as implemented in SRCMOS logic.

In equation 3 above, the logic functions for a dual rail sum circuit, generating signals $S_i$ and $\overline{S_i}$ were expanded, showing that the sum circuit requires the presence of both the true signals $C_i$ and $A_i$ and the complement signals $\overline{C_i}$ and $\overline{A_i}$. In SRCMOS logic, signals are represented by voltage pulses on a net. To evaluate the sum logic correctly, the pulses representing the above signals have to overlap in time. This is accomplished in the following manner.

Figure 4:
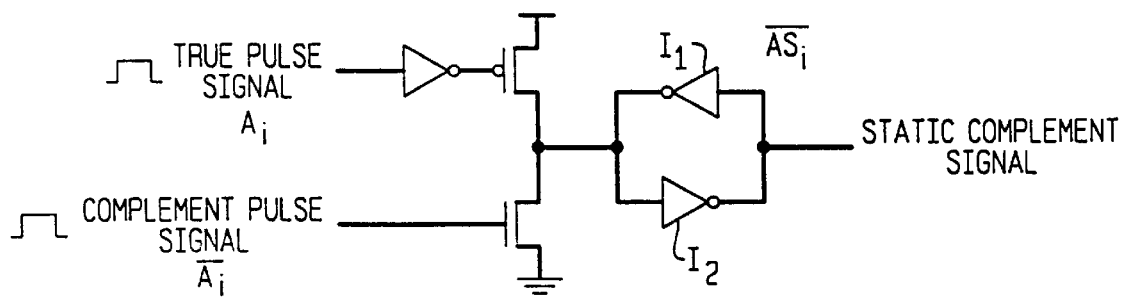
FIG. 4 shows an input latch of FIG. 1, used to convert dual rail pulsed input signals to a static signal.

The true and complement input pulses $A_i$ and $\overline{A_i}$ are captured in input latches, as given in FIG. 4, which act as pulse to static converters. In a given machine cycle, an (active high) pulse only appears on one of the two inputs, which then sets the latch, comprised of back to back inverters I1 and I2, to have either output node $\overline{AS_i}$ following a pulse on input node $A_i$, or to have $\overline{AS_i}$ high, following a pulse on input node $\overline{A_i}$. The output $\overline{AS_i}$ is therefore a static representation of the dual rail pulsed input signals.

Figure 5:
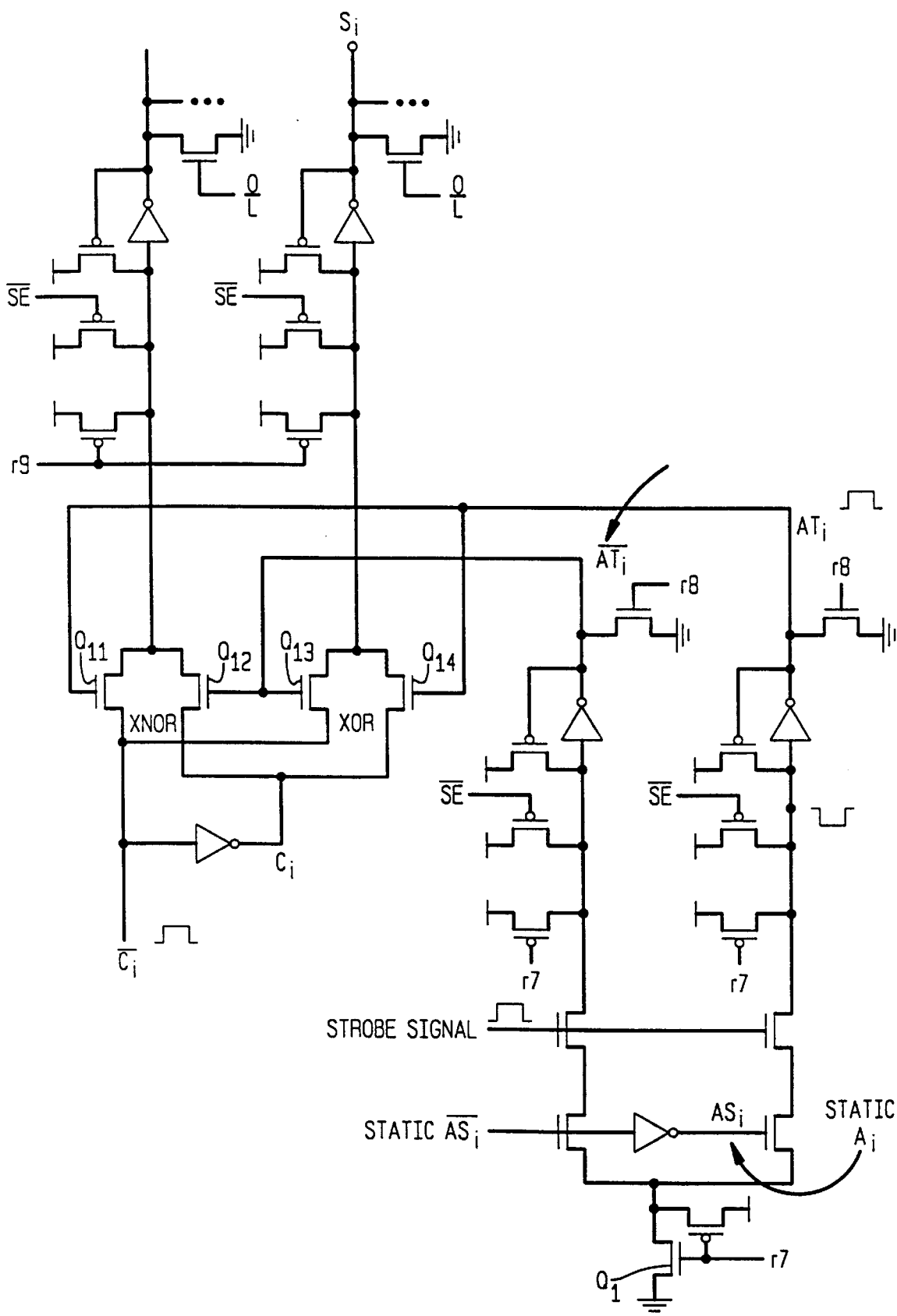
FIG. 5 shows the self resetting strobed sum circuit.

The static $\overline{AS_i}$ signal from FIG. 4 is now fed into the sum XOR circuit of FIG. 5., and inverted to yield static signal $AS_i$. Both $AS_i$ and $\overline{AS_i}$ are then combined (AND-ed) with a strobe pulse, to generate either a true or a complement pulse, $AT_i$ or $\overline{AT_i}$, respectively. By use of the strobe, these last pulses are timed to coincide with (or be slightly delayed with respect to) the pulsed $\overline{C_i}$ signal resulting from the OR tree of FIG. 2. The AND-ing of $AT_i$ or $\overline{AT_i}$ with $C_i$ and $\overline{C_i}$ constitutes the appropriate XOR or XNOR function to calculate the output sum signals $S_i$ and $\overline{S_i}$.

Figure 6:
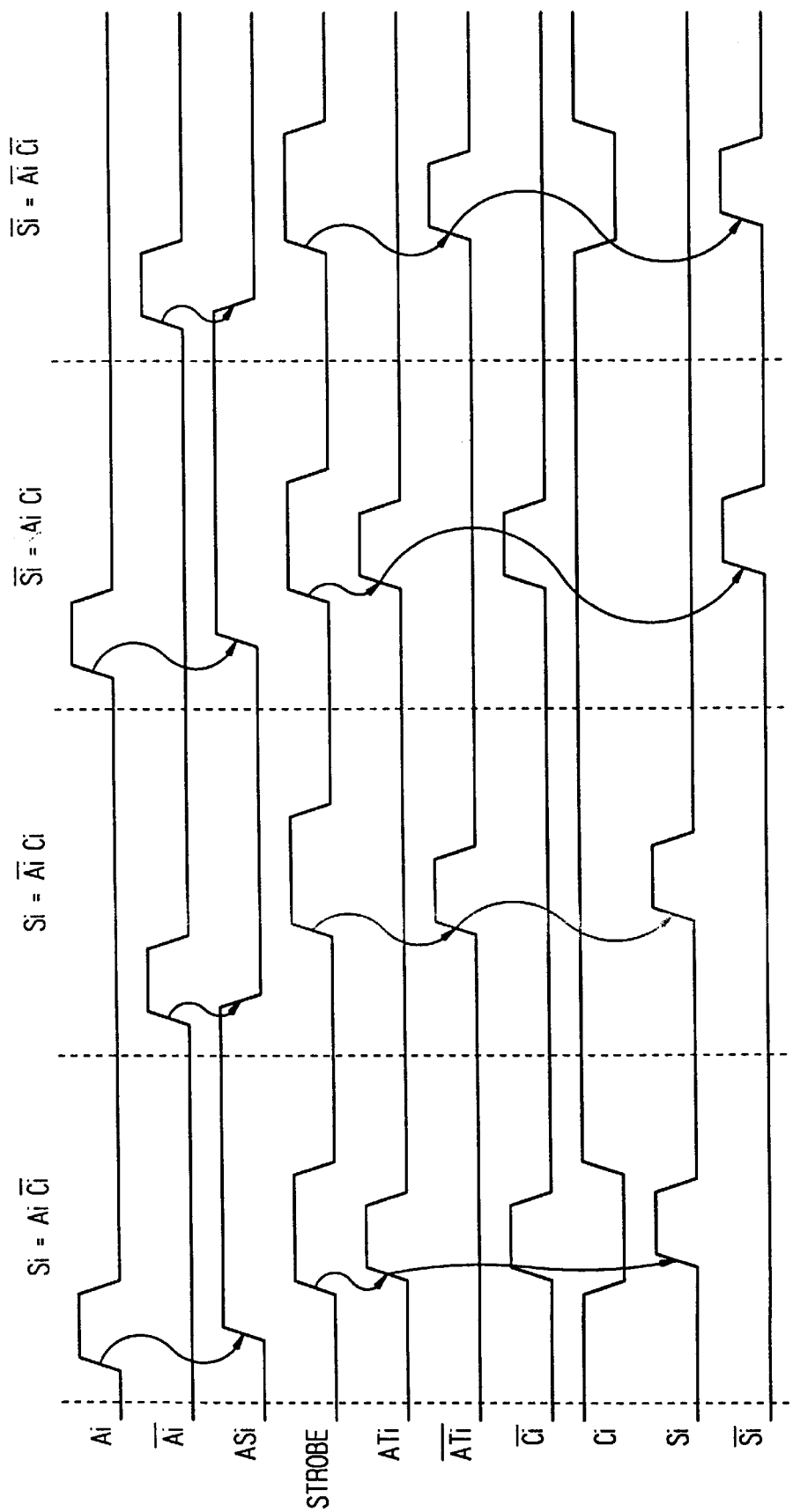
FIG. 6 shows waveforms corresponding to the circuits of FIGS. 4 and 5.

Waveforms are given in FIG. 6 for each possible combination of $A_i$, $\overline{A_i}$, $C_i$ and $\overline{C_i}$, as depicted in 4 successive cycles separated by the vertical dividing lines, and annotated with the sum logic term activated during each cycle.

In the 1st cycle, annotated with $S_i=A_i\overline{C_i}$, an input pulse on net $A_i$ results in $AS_i$ going high, so that the strobe triggers a pulse on $AT_i$. If the OR tree resulted in $\overline{C_i}$ firing, coincident with the strobe, then $C_i$ is low during the pulse $AT_i$, which therefore triggers, through transistor Q14 in FIG. 5, a pulse on output net $S_i$. In the next cycle, annotated with $S_i=\overline{A_i}C_i$, a similar sequence of events is depicted for an input pulse on net $\overline{A_i}$. This results in a pulse $\overline{AT_i}$ at the time of the strobe. Since $\overline{C_i}$ did not fire (i.e., stays low), the $\overline{AT_i}$ pulse activates a pulldown conduction path through transistor Q13, resulting again in an output pulse $S_i$.

The rest of the cycles of FIG. 6 are analogous to those described above.

In FIG. 5, it is noticed that ground interrupt device Q1 allows reset signal r7 to start the reset (trailing edge) of $AT_i$ or $\overline{AT_i}$ before the trailing edge of the strobe. This feature allows pulse width control of the sum circuit independent of the pulse width in the carry tree.

The calculation of the sum in two stages in FIG. 5 allows the final nFET AND stacks in the XOR and XNOR subcircuits to be only two high, rather than 4 high ($AS_i$, $C_i$, strobe and ground interrupt). This optimizes the speed of the critical path.

Figure 7:
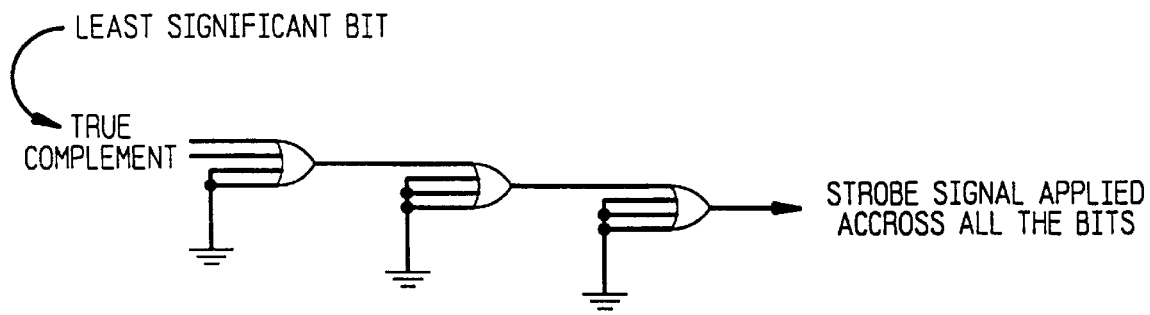
FIG. 7 shows the strobe generator circuit which generates a strobe signal that matches the timing of the OR tree.

For correct operation of the described circuit, the timing of the strobe signal is critical. As shown in FIG. 1 and FIG. 7, the strobe signal is generated by an OR function from the true and complement input of the least significant bit (LSB): strobe=$A_0+\overline{A_0}$. The strobe is then propagated to track the critical path in terms of time delay of each stage. To ensure that the tracking has minimal dependence on process variations, the strobe propagation circuit mimics the carry tree by employing a series of 4-wide OR gates with unused inputs tied to ground, as shown in FIG. 7.

According to the SRCMOS circuit methodology, the unipolar switching circuits described above in FIGS. 3 and 5 are reset using a locally derived reset signal, as opposed to a reset (precharge) by a global clock, as in Domino logic. For better margins control as well as low circuit cycle time two reset chains are used, as shown in FIG. 1 and as detailed in FIG. 8. The first reset chain, generating reset pulses r1, r2, r3, r4, r5 and r6 services the OR gate tree and is triggered by the rising edge of the strobe signal. Since this chain resets the OR tree, it will also reset the strobe signal to standby low.

The second reset chain applies to the sum circuits of FIG. 5, generating reset pulses r7, r8, r9 and r10. This chain is triggered by a very wide OR of all the sum circuit outputs $S_i$ and $\overline{S_i}$ (i=0 . . . n−1) of FIG. 5. Whereas each of the nFETs Q0a through Q63b in FIG. 8 may not be strong enough to pull down the "titrating OR" node S_OR, during the course of the evaluation of the sum circuits, eventually half of the nFETs will switch on, pulling down the S_OR node in the process, and triggering the reset chain.

The pulse width of nodes r7 through r10 is governed by the feedback loop starting from node r9a. The S_OR node itself is reset using the feedback loop starting from node r9.

Figure 8:
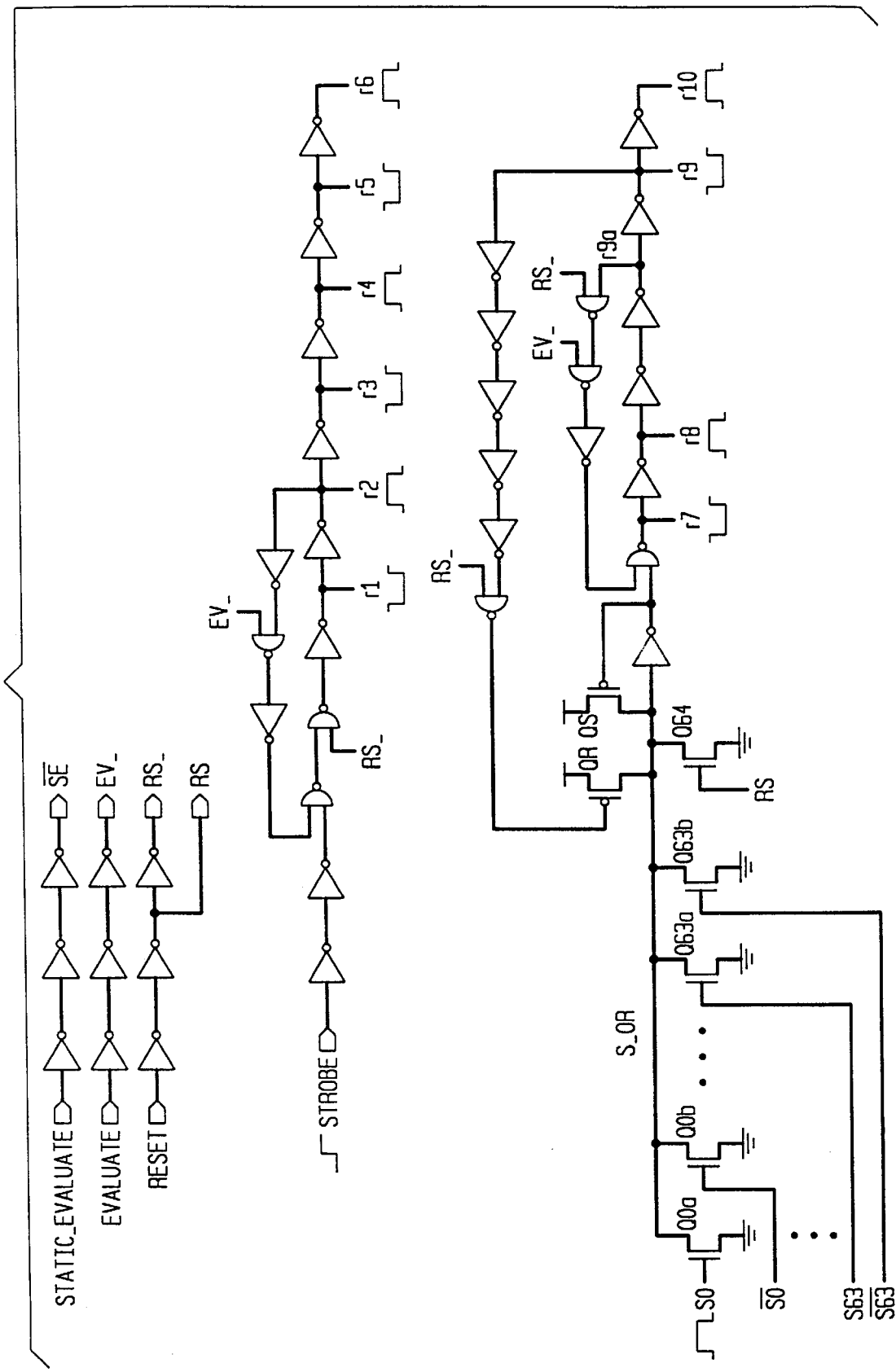
FIG. 8 shows the configurations of reset chain 1 and reset chain 2 of FIG. 1.

The polarities of the various pulsed signals (active high or low) is schematically indicated in FIG. 8. Odd numbered reset pulses are active low (applied to pFETs), whereas even numbered reset pulses are active high and applied to nFETs.

Breaking the reset chain into two parts allows for easy output pulse width control, as indicated above. The reset chains can easily be altered by changing device sizes as well as adding additional links. This way, margins between reset pulses can be tailored and pulse widths can be controlled.

The reset chains comprise the necessary logic to force or to inhibit the reset signals, as required by the test modes for SRCMOS described in copending Chappell. The state of the global signals Reset, Evaluate and Static_Evaluate in the functional operation modes and various test modes is given in the following table (where L=low voltage (ground) and H=high voltage (vdd)):

|  | Global signal | | |
| --- | --- | --- | --- |
| mode | Reset | Evaluate | Static_Evaluate |
| Functional | L | L | L |
| Reset | H | L | L |
| Evaluate (leakage) | L | H | L |
| Static_Evaluate | L | H | H / switching |

In particular, the forced reset mode (Reset) or inhibited reset mode (Evaluate) are indicated by global signals Reset and Evaluate, respectively, and their locally buffered (and possibly inverted) versions RS, RS_ and EV_, as shown in FIG. 8.

Furthermore, all unipolar switching nodes in the SRCMOS circuits described in FIGS. 3 and 5 have been equipped with small leakage pFETs, activated in Static Evaluate test mode by an active low signal $\overline{SE}$, which is a locally inverted and buffered representation of global signal Static_Evaluate, again as described in copending Chappell. Thus the present circuit fully complies with the SRCMOS test modes described therein.

What is claimed is:

1. An incrementing circuit comprising:
   an input latch for receiving a pulsed input data and outputting a static complement of the pulsed input data, the pulsed input data representing a number to be incremented;
   a carry-lookahead circuit, coupled to receive said static complement of the pulsed input data, said carry-lookahead circuit for generating a carry signal from the number to be incremented; and a summing circuit coupled to receive the carry signals from the carry-lookahead circuit and the pulsed input data representing the number to be incremented, said summing circuit for summing said carry signals and said pulsed input data and producing a pulsed output representing a sum.

2. The circuit of claim 1, further comprising a strobe circuit for generating a triggering output to trigger said summing circuit to add the carry signals and the pulsed input data.

3. The circuit of claim 1, wherein the carry lookahead circuit is an OR tree.

4. The circuit of claim 3, wherein the OR tree evaluates the carry signals using negative logic.

5. The circuit of claim 1, wherein the OR tree is implemented using dynamic logic.

6. The circuit of claim 5, wherein the dynamic logic is self-resetting, and the reset signal is triggered locally.

7. The circuit of claim 5, wherein a reset provided to the OR tree is globally generated.

8. The system of claim 1, wherein the summing circuit is implemented using dynamic logic.

9. A method for incrementing a number represented by a pulsed electrical signal, comprising steps of:

converting the pulsed electrical signal representing the number into a static signal;

using a complement of the pulsed electrical signal to determine carries required for incrementing the number;

generating a pulsed data representation of the carries; and summing the static signal and the pulsed data representation of the carries to form a pulsed representation of the incremented number.

* * * * *